United States Patent
Finkenzeller et al.

(10) Patent No.: US 10,249,125 B2
(45) Date of Patent: Apr. 2, 2019

(54) SEAL AND METHOD FOR TESTING A PRODUCT FOR MANIPULATION

(71) Applicant: GIESECKE+DEVRIENT CURRENCY TECHNOLOGY GMBH, München (DE)

(72) Inventors: Klaus Finkenzeller, Unterföhring (DE); Volker Stöhr, München (DE); Ferdinand Burianek, München (DE); Wilfried Rill, Gablingen (DE); Carsten Bohn, München (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 15/570,097

(22) PCT Filed: Apr. 29, 2016

(86) PCT No.: PCT/EP2016/000700
§ 371 (c)(1),
(2) Date: Oct. 27, 2017

(87) PCT Pub. No.: WO2016/173718
PCT Pub. Date: Nov. 3, 2016

(65) Prior Publication Data
US 2018/0144573 A1 May 24, 2018

(30) Foreign Application Priority Data
Apr. 29, 2015 (DE) .................. 10 2015 005 556

(51) Int. Cl.
*G07D 11/225* (2019.01)
*G07D 11/12* (2019.01)
(Continued)

(52) U.S. Cl.
CPC ..... *G07D 11/225* (2019.01); *G06K 19/07798* (2013.01); *G07D 11/0006* (2013.01);
(Continued)

(58) Field of Classification Search
CPC ............. G07D 11/042; G07D 11/0006; G07D 11/0063; G07D 11/009; G06K 19/07798; G09F 3/0329
See application file for complete search history.

(56) References Cited

U.S. PATENT DOCUMENTS

| | | | |
|---|---|---|---|
| 7,893,832 B2 | 2/2011 | Laackmann | |
| 2005/0121898 A1* | 6/2005 | Laackmann | G06K 19/07 283/70 |

(Continued)

FOREIGN PATENT DOCUMENTS

| | | |
|---|---|---|
| DE | 19809574 A1 | 9/1999 |
| DE | 10357196 A1 | 7/2005 |

(Continued)

OTHER PUBLICATIONS

German Search Report from DE Application No. 10 2015 005 556.9, dated Nov. 30, 2015.

(Continued)

*Primary Examiner* — Leon Viet Q Nguyen
(74) *Attorney, Agent, or Firm* — Workman Nydegger

(57) ABSTRACT

A method for sealing and checking a product for manipulation with a seal and to a corresponding seal, wherein the seal comprises an antenna, a chip, a measuring element, and a measurement device. For sealing and checking the product for manipulation, a step of arranging the seal at the product to be sealed is carried out, wherein the product is mechanically sealed. The seal receives a check query by means of contactless data transmission from a read-write device, determines the physical property of the measuring element (Continued)

as a first measurement value by the seal, prepares a response to the query by the chip, sends by means of contactless transmission the response to the read-write device, the response of the chip relating to the first measurement value, and compares the first measurement value with a reference value.

20 Claims, 10 Drawing Sheets

(51) Int. Cl.
    *G07D 11/26*      (2019.01)
    *G06K 19/077*      (2006.01)
    *G07D 11/00*      (2019.01)
    *G09F 3/03*      (2006.01)

(52) U.S. Cl.
    CPC ..... *G07D 11/0042* (2013.01); *G07D 11/0063* (2013.01); *G07D 11/12* (2019.01); *G07D 11/26* (2019.01); *G07D 11/009* (2013.01); *G09F 3/0329* (2013.01)

(56) References Cited

U.S. PATENT DOCUMENTS

| | | |
|---|---|---|
| 2005/0231365 A1* | 10/2005 | Tester .............. G06K 19/07798 340/568.1 |
| 2008/0073437 A1 | 3/2008 | Laackmann |
| 2009/0072553 A1* | 3/2009 | Mangone, Jr. .......... G09F 3/037 292/315 |
| 2016/0340087 A1* | 11/2016 | Kropf ................ B65D 75/5883 |

FOREIGN PATENT DOCUMENTS

| | | |
|---|---|---|
| DE | 102007022460 A1 | 11/2008 |
| DE | 102007048423 A1 | 4/2009 |
| DE | 102011050196 A1 | 11/2011 |
| EP | 2833342 A1 | 2/2015 |

OTHER PUBLICATIONS

International Search Report from PCT Application No. PCT/EP2016/000700, dated Jul. 19, 2016.

* cited by examiner

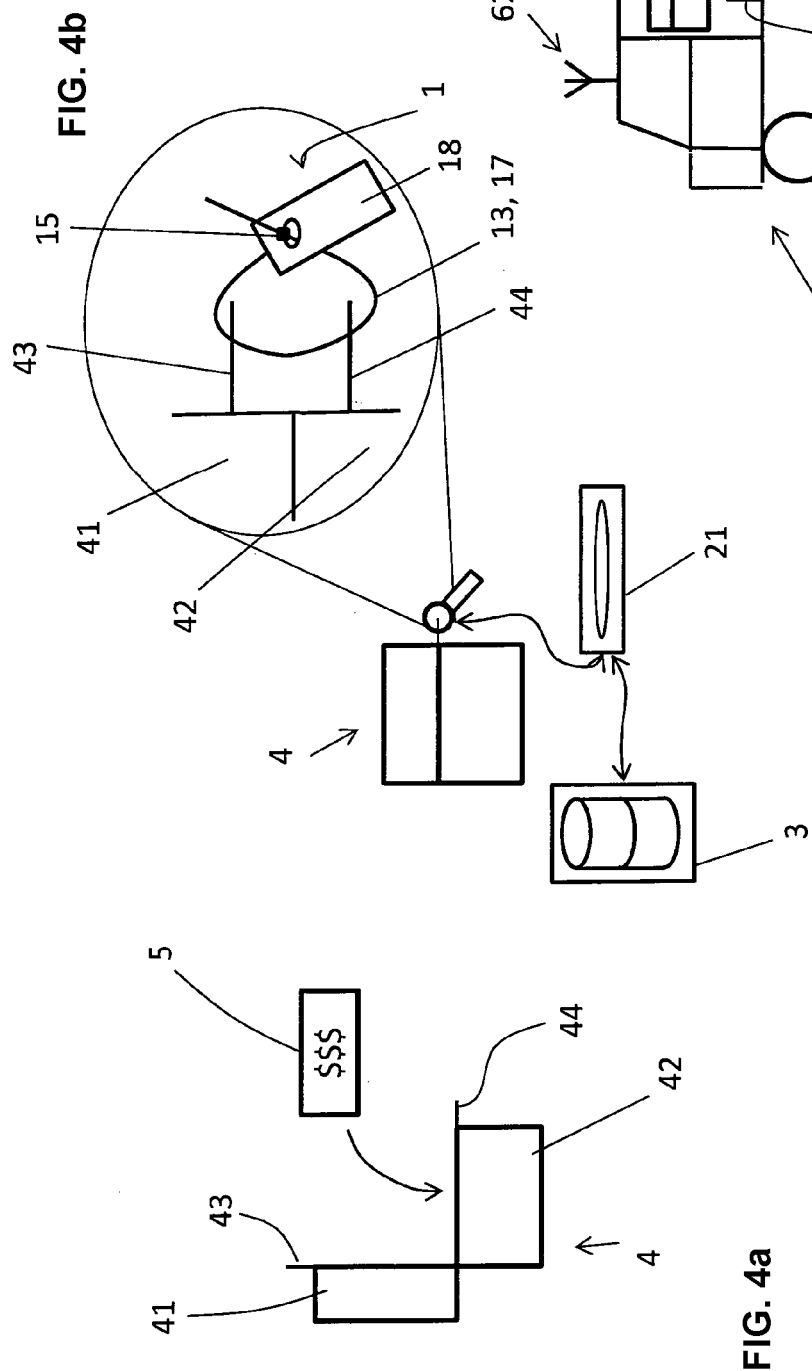

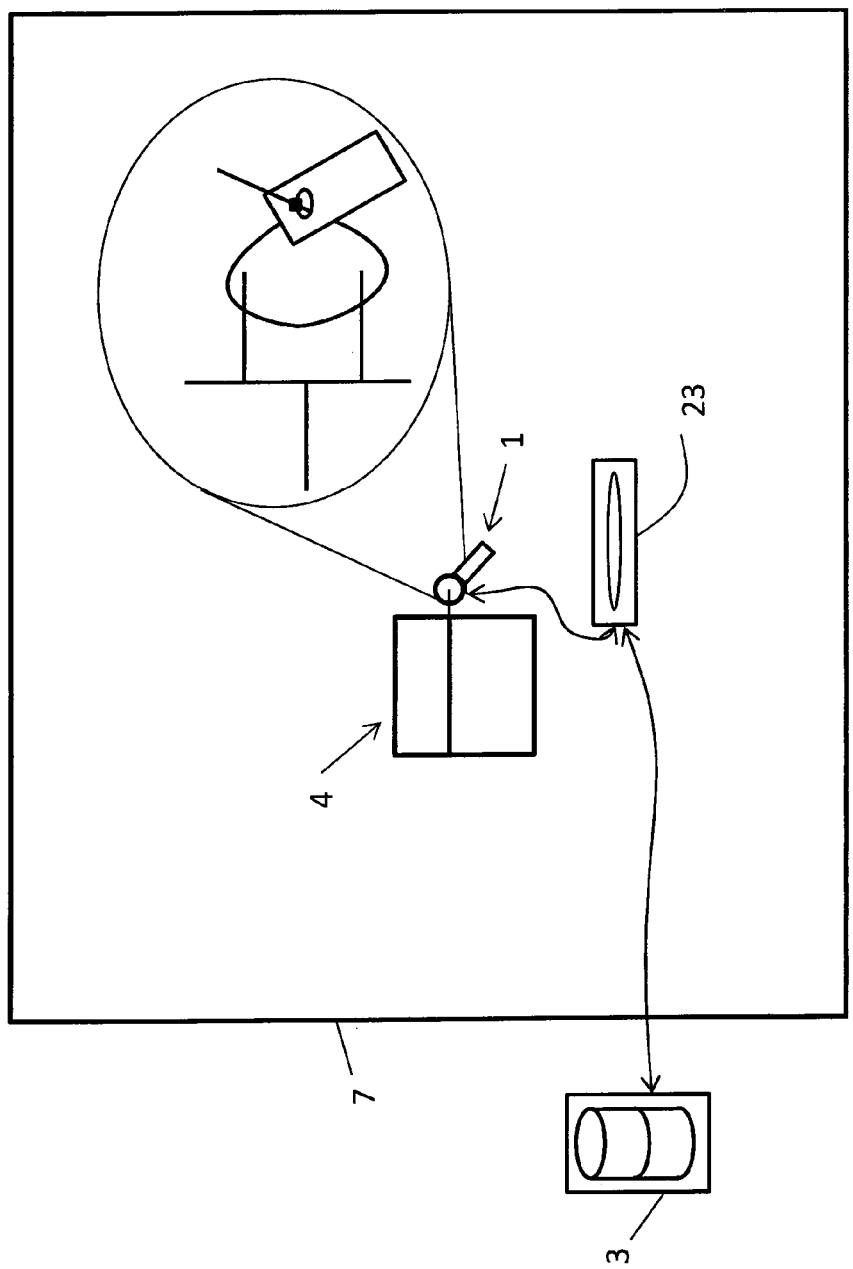

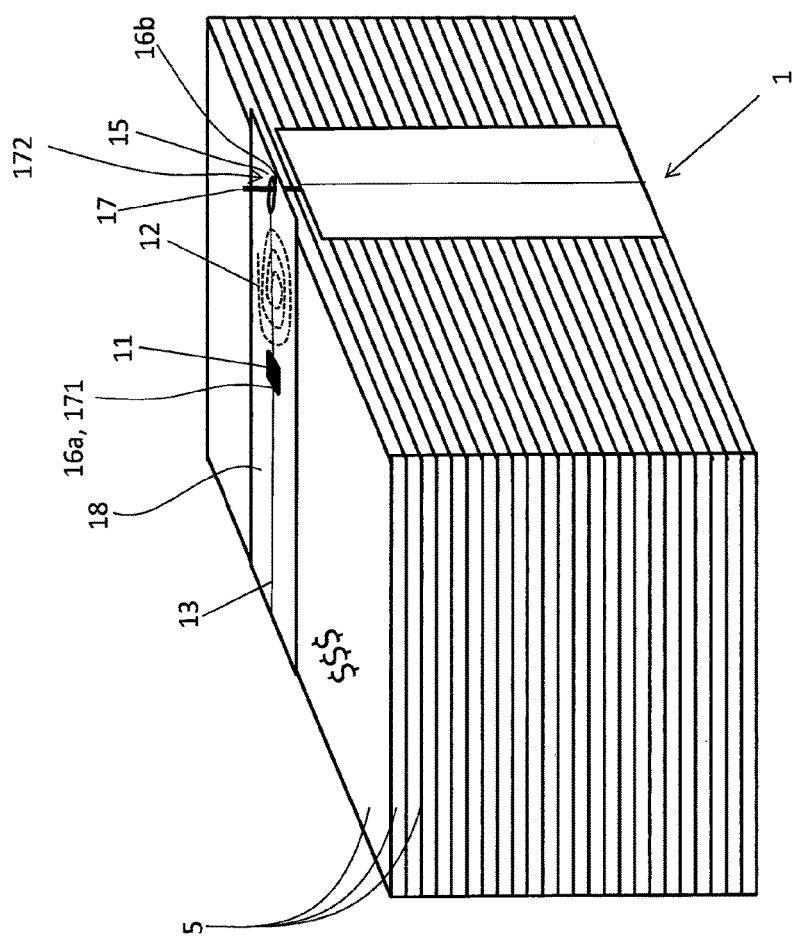

SEAL AND METHOD FOR TESTING A PRODUCT FOR MANIPULATION

BACKGROUND

The invention relates to a method for checking a product for manipulation. The invention furthermore relates to a seal and a system for the sealed transport of objects of value.

For ensuring the authenticity and intactness of a product, the product is normally provided with a seal. With the help of the seal, often also referred to as security seal, it can be ascertained whether a manipulation has been performed on the product. The intactness of the product shows at the same time its intactness and is often valid as a proof of its authenticity. The product can be a container in which there is arranged an object to be secured.

The seal does normally not prevent a manipulation of the product and/or of the object in the product; it normally serves merely as a manipulation proof. E.g., by the seal it is proved that a container for sensitive contents, for example a transport box for objects of value, an envelope, or a housing of a calibrated instrument, e.g., counter, has not been opened (without authorization). If the seal is not destroyed (broken, attacked), one can assume that the sensitive content was not manipulated. Only authorized persons may usually attach and remove seals.

Seals are employed in different configurations. There are seals which are attached to the product to be sealed in a liquid state of aggregation, for example letter envelope (wax seal). Furthermore, seals can be arranged onto the product by mechanically locking them. Seals can be formed similar to a cable tie and be arranged onto the product to be sealed, preferably a container. Via the seal an access to contents in the product can be proven. Such mechanical seals can be used for sealing containers for bank notes (cash box) or containers for sterile medical instruments. Furthermore, there are known areal adhesive seals. The adhesive seals are formed as an adhesive strip and are glued, for example, onto an opening region of a transport container. For opening the transport container, the seal must be ripped. The seal can be optically checked by the human eye.

Seals can be provided with printed information. The information can be applied, for example, in text form or encoded, for example as a 2D code, e.g. bar code or QR code.

In the example of monetary cycle, bank notes are arranged in bundled fashion in a cash box. The cash box is mechanically sealed with the help of a mechanical seal. The seal has a bar code printed thereon which reproduces the value of the content of the cash box. For opening the cash box, the seal must be destroyed. When handing over the cash box at a destination, the seal is checked optically and manually for damage. If there is no damage, the seal is considered to not have been forced open and there is no unauthorized access to the cash box or the contents thereof.

With solutions of the prior art, the intactness of a product can be verified. Non-permissible or unauthorized manipulations on objects of value and sensitive objects can be proven. Manipulated objects or objects which were potentially manipulated without authorization can be recognized optically.

The hitherto known possibilities require a high personnel expense. The level of automation is low. In addition, an attacker could repair or replace a broken seal, so that an optical recognition of an unauthorized manipulation is not or hardly possible by an employee.

SUMMARY

The object of the invention is to show a seal, a method, and a system, with which the level of automation is increased. Furthermore, a reliable proof of a manipulation of the seal should be possible.

A method according to the invention for sealing and checking a product for potential manipulation provides that a seal is supplied. The seal has an antenna, a chip, a measuring element and a measurement device. The measuring element is adapted and formed for changing a particular physical property upon a manipulation of the seal and/or product. The measurement device is suitable and formed for determining the physical property of the measuring element. In one step, the seal is arranged onto the product to be sealed. The product to be sealed is considered to be sealed. The seal receives a check query from a read-write device preferably via a wireless communication interface. In a detection step, the physical property of the measuring element is determined as a first measurement value. The chip prepares a response relating to the first measurement value and sends the response via the wireless communication interface to the read-write device. A comparison of the first measurement value with a reference value yields whether the seal or the product was manipulated.

The method according to the invention creates the possibility of ascertaining the attack also with a repaired seal after a manipulation (attack). A manipulation of the seal effects a plurality of changes in physical properties of the seal. According to the invention it is provided that the measuring element is formed, with respect to a manipulation, at the seal in exposed fashion and that a manipulation of the seal causes a manipulation of the measuring element.

For the check of the measuring element, different physical properties can be considered. There can be determined electric properties, as for example electric conductance, capacitance or impedance, on the one hand, and optical properties, such as for example a light refraction index, or acoustic properties, on the other hand. In addition, there can also be determined length properties by optical runtime measurement, phase shift of light frequency or reflection measurement. Also reflecting properties are conceivable here. Furthermore, the physical property can be checked merely in binary fashion, e.g. by checking whether there is a light, sound and/or electrical conduction.

The reference value for the measurement values can be determined during the manufacturing of the seal, preferably in the manufacturing plant. The reference value and/or the first measurement value is deposited preferably with a unique identification of the chip and/or of the seal in the chip, in a user device, and/or in a background system for a unique identification of the chip and/or the seal. The user device can be, for example a portable computer, a mobile communication device, e.g., smartphone or tablet, and/or an, in particular mobile, end device especially provided for sealing.

In one embodiment, the reference value can be replaced by the first measurement value. In particular when the seal of the invention is used repeatedly, a deviation is conceivable. The reference value can be obtained or specified during the manufacturing of the seal and/or during the sealing. In particular when the reference value was determined during the sealing, the reference value may deviate from a hitherto specified reference value.

After the sequence of operations described above, a further query for checking the seal may be sent by a read-write device. The seal determines the physical property of the measuring element as a further measurement value. A comparison of the further measurement value with the reference value yields whether the seal was manipulated. If the comparison yields that there was no manipulation, preferably the further measurement value is stored as a reference value. This is an iterative process. Upon a further query, again, a further measurement value is determined.

In one embodiment, the reference value and/or the first measurement value can be determined during sealing the product and/or during attaching the seal to the product. The measurement device, preferably part of the chip, determines the reference value and/or the first measurement value. Preferably, the measurement device interprets the reference value and/or the first measurement value as to a manipulation of the seal.

The communication between chip or seal and the read-write device is effected preferably via wireless transmission. Preferably, information is transmitted by means of RFID (Radio Frequency Identification) technology. Particularly preferably, for communicating the principle of modulated backscattering (often also referred to as UHF backscattering) is employed. In a preferred configuration the seal is operated without battery. The antenna generates from the electromagnetic field of the read-write device (reader field) an electric energy for operating the chip.

In a preferred embodiment, the read-write device can carry out the comparison of the reference value with the first or further measurement value. The read-write device can read out the reference value from the memory of the chip and/or obtain it through a communication interface from a background system.

Furthermore, the chip can compare the reference value with the second measurement value. If a difference is ascertained, the chip preferably evaluates the difference and accordingly prepares a statement as to whether a manipulation of the seal is present or could be present. This statement can be formulated in the response to the read-write device. The statement can additionally comprise the reference value, first and/or further measurement value.

The background system can be a computer, in particular a server. The computer can be connected with the read-write device via a network, for example. The read-write device can be part of the background system, the background system using merely the read-write device for communicating with the seal. For example, the background system is a mobile computer in which the read-write device is implemented, for example, as an NFC interface. Furthermore, the background system can access a data base in which, for example, an identification of the seal, in particular of the chip is stored in connection with the first measurement value and/or the second measurement value.

It is not necessary to use equal read-write devices and background systems. Rather, different devices can be used, for example mobile end devices such as smartphones, tablets or notebooks.

In one embodiment it can be provided that the seal comprises an interface device. Via the interface device the chip or the measurement device is connected with the measuring element. The interface device can be formed to be configurable. I.e., the connection between the chip or the measurement device with the measuring element is made only by after configuring.

Preferably, the seal comprises a further, at least a second measuring element. The further measuring element is likewise connected with the interface device. This can be configured such that the chip or the measurement device can selectively access at least one of the measuring elements. The configuration be deposited in the chip and/or in the background system. Terminals of measuring elements do not have to be connected with terminals of the interface device in targeted fashion already during the manufacturing of the seal or during the sealing. Rather, the respective terminals can be associated randomly. The association can be effected by a configuration matrix in the interface device, by associating terminals of the interface device with terminals of the chip or of the measurement device. For example, in an attack on the seal by ripping, which simultaneously leads to a ripping and damage of the measuring elements, the sectional image cannot lead to an association between measuring element and interface or measurement device. The attacker could repair the seal optically, a functional repair is not possible, however. In an advantageous embodiment, the interface is a self-learning interface matrix which prepares the configuration matrix e.g. by self-check. For example, during sealing, the configuration matrix or its control checks the terminals of the interface device to the measuring elements, for example by means of continuity check, and accordingly prepares a configuration.

Preferably, the association of the terminals of the interface device with terminals of the chip or the measurement device is not permanent. It is preferred, that the association is activated only when the first and/or second measurement value is to be determined. In other words, the physical association is effected not until during the operation of the chip. This can be initiated, for example, by the read-write device. An attacker cannot repair or disguise a manipulation of the seal, because it is not possible for the attacker, after manipulating the seal, to make an association of the terminals, in particular when a plurality of measuring elements is used. In addition, upon production of the seal, the connection between interface device and measuring element is freely selectable, so that the manufacturing need not be precisely. The manufacturing is easier and faster. In addition, it is guaranteed that seals of the same type do not correspond to each other. For manipulating the seal without a proof being possible, an attacker would have to analyse each seal separately. A transmission from seal to seal is not possible.

For associating the terminals of the interface device with terminals of the chip or of the measurement device, an association table can be stored in the chip and/or in the background system.

The interface matrix can be formed as a hard-wired matrix. In particular when several measuring elements are used, it would be possible to guide these substantially in a twisted and/or intertwined fashion, for example in and/or at a fastening element. Preferably, the measuring elements cannot be distinguished from each other optically by the human eye. The interface matrix may comprise at least one contacting by which at least one of the several measuring elements is contacted. After a manipulation at least the physical property and/or the association of the interface with the contacted measuring element changes, so that the manipulation can be reliably recognized.

Preferably the majority of the measuring elements can be arranged, according to one configuration, in a twisted fashion in the fastening element. In particular, the measuring elements can be present in a biased fashion, for example via the interface and/or via the fastening element, for example, by overmolding. Alternatively, the enclosure of the fastening element can surround the measuring elements as a sleeve without surrounding it form-fittingly. If the measuring elements are present in a biased fashion and if these are formed from a spring material, upon a manipulation of the seal, in particular upon ripping of at least two measuring elements, the measuring elements will orient themselves approximately randomly. The more measuring elements are ripped, the more impossible a joining of the separated measuring elements becomes.

Preferably, the communication between seal and read-write device as well as, where applicable, with the background system is performed in encrypted fashion. Contents regarding the first and/or second measurement value and regarding the qualitative statement as to the manipulation of the seal, and/or where applicable regarding the configuration of the seal are not recognizable for an attacker by intercepting the communication.

In an advantageous configuration, the seal is formed as a pull-tight seal. The product is preferably a container formed for receiving a value element, for example bank notes. The seal is arranged preferably at the container and thereby sealed. For example, the seal is arranged at a strap of the container above an opening. A direct access to the value element is only possible by the seal, in particular the measuring element, being manipulated, preferably destroyed. Then, the container can be opened.

A seal according to the invention comprises a fastening element, a chip, an antenna and a connection element. The fastening element is formed to be flexible and elongate in a strip shape and has a first and second end. The fastening element comprises a measuring element. The fastening element has a first and a second fastening element contact portion. The connection element is formed and suitable to contact the first and the second fastening element contact portion of the fastening element. A measurement device of the seal is connected with the measuring element. The measurement device is connected via an interface device with the measuring element. The measurement device is suitable to determine a particular physical property of the measuring element.

Via the antenna of the seal the chip of the seal can wirelessly communicate with a read-write device and exchange information therewith. The chip has a processor and preferably a memory. The measurement apparatus can be arranged in the chip, i.e. be part of the processor.

The connection element contacts, preferably mechanically undetachably, the first and/or second fastening element contact portion. After establishing the contact between the connection element and the fastening element the contact points can only be separated preferably by means of destruction of the first or second fastening element contact portion. For example, the contact can be established by locking, melting and/or overmolding.

In one embodiment, the second fastening element contact portion is formed for a non-destructive undetachable arrangement at the product to be sealed, and upon manipulation of the seal, in particular in the case of an access to the product, the fastening element is at least damaged.

In one embodiment, the measuring element is suitable for transmitting electric signals and accordingly formed as an electric conductor. Preferably, the electric conductor is formed flexibly. The electric conductor is dimensioned with regard to material and cross-section such that it is damaged, in particular destroyed, upon an attack on the fastening element and thus on the electric conductor. For example, the electric conductor is a wire having a diameter of at most 0.1 mm. Basically, the fastening element or the measuring element are severable, for example, with a knife or scissors. The conductor is preferably embodied as an enameled wire. I.e., the conductor has a core made of a conductive material, preferably copper, the core being provided with an enameling for electric insulation and for protection of the conductive material. The conductive core can be formed as a solid or multiple-wire, in particular fine- or finest-stranded conductor or as a netting.

Basically, the fastening element or measuring element can be designed such that upon a defined tensile load, e.g. human normal force, it is severed. Furthermore, the fastening element or measuring element can have predetermined breaking points.

In one embodiment, the measuring element can be formed for transmitting optical signals. The measuring element can be an optical conductor, e.g., glass fiber, PMMA (polymethyl methacrylate). In one configuration, a reflection unit can be formed at the end of the measuring element, so that the optical conductor can be checked by reflexion. Accordingly, the optical conductor is to be provided merely as a forward conductor, a return conduction being thus effected by the optical conductor itself. Likewise, an uncoupling or coupling is not necessary. Furthermore, the measuring element can be formed as an acoustic conductor. For example, the acoustic conductor can be configured as a hollow conductor. The measurement device can determine a frequency position, phase shift, a resonance frequency and/or a pulse spacing as a measurand. With an acoustic measurement a manipulation of the seal, in particular of the fastening element, can be reliably ascertained, because any change of the fastening element causes a change of the acoustic properties. As an acoustic conductor there can be used various materials, for example metals or gases. In one embodiment, the measuring element is formed as an at least partially hollow body. The hollow block at its inner wall can be provided with a coating, for example an electrically and/or optically conductive coating. Furthermore, the coating can have particular optical and/or acoustic reflecting properties or absorption properties.

The measuring element in the fastening element can be formed as a single conductor which extends away from the connection element and in the contacted state, i.e. the connection element contacts the first and second fastening element contact portion, back again. Preferably, the measuring element occupies one single path in the longitudinal direction of the fastening element. A sectional area perpendicular to the longitudinal extension of the fastening element would show the cross-sectional area of the measuring element. The connection element contacts the measuring element via the first or second fastening element contact portion of the fastening element. A signal of the measurement device can be led via the connection element, the first fastening element contact portion of the fastening element, the measuring element, the second fastening element contact portion of the fastening element, and the connection element again to the measurement device. A check of the measuring element, in particular between the first and second fastening element contact portion and thus a check for intactness of the fastening element is possible. Of course, a plurality of such measuring elements can be arranged in the fastening element.

Alternatively, the measuring element can be formed as a conductor loop. I.e., the measuring element is formed in some portions in the fastening element as a double conductor and thus occupies at least two paths. A sectional area perpendicular to the longitudinal extension of the fastening element would show at least twice the cross-sectional area of the measuring element. Preferably, the first and second fastening element contact portion lie adjacent to each other, preferably at the same local position, in longitudinal extension of the fastening element. A signal coupling and a signal decoupling takes place at an at least approximately equal place. Preferably, the return point is located before the end of the fastening element, so that the return point is covered by the fastening element.

In a preferred configuration, in a measuring element as a merely forward conductor, the maximum distance of one end of the measuring element, which with the seal not activated is connected with the interface, is smaller than the distance to the second fastening element contact portion. The same holds for the return point in the case of a measuring element as a forward and return conductor. With a configuration as a forward and return conductor as well as with a configuration as a forward conductor, a mechanical fastening of the second fastening element contact portion of the fastening element, for example by a clamping connection and/or locking connection, before the maximum distance of the measuring element is preferred. Breaking open or a manipulation of the seal relates to a manipulation of the measuring element.

In a preferred embodiment, the fastening element has an enclosure. Preferably, the enclosure is formed from an electrically, acoustically and/or optically non-conductive plastic material and is flexible. The enclosure may surround the measuring element partially. Alternatively, the fastening element may comprise at the enclosure a free region with access to the measuring element. The enclosure is formed to enable at the first and second fastening element contact portion a contacting of the connection element with the measuring element.

In a configuration, the enclosure is arranged in adjacent and immediately neighbouring fashion with respect to the measuring element. Alternatively, the enclosure may be formed as a tube into which the measuring element extends. I.e., the measuring element is movable to a certain degree within the enclosure. The measuring element is not surrounded form-fittingly by the enclosure.

In an advantageous configuration, the seal comprises a further measuring element (measuring elements) in addition to the measuring element. The further measuring element can be configured similar to the first measuring element. The measuring elements can be interconnected or coupled to each other. Furthermore, the measurement unit can determine a physical property for each of the measuring elements. The physical property may vary with the measuring elements, for example electric conductance and optical continuity.

In one embodiment, the interface device comprises an interface. Via the interface, the measurement device can be connected via the first and/or fastening element contact portion with the measuring element. The interface can have a clamping apparatus. The clamping apparatus can be formed as a cutting and clamping apparatus (insulation displacement apparatus) and/or lamella contact. The interface penetrates the enclosure (if present) and contacts the measuring element.

In one embodiment, the region of the measuring element contacted by the interface is connected with the interface device in a firm, in particular force-fitting and/or material-locking fashion, for example by crimping, soldering, and/or welding. Furthermore, at least one region of the measuring element contacted by the interface can be connected detachably, for example by clamps, with the interface device.

After the physical property of the measuring element being initially obtained, any manipulation of the measuring element can be ascertained due to a change of the physical property thereof. A property already ascertained by the measurement device (reference value) can be reset preferably by an authorized user. This reference value is deposited as an essential value and forms a basis for the evaluation for manipulation of the seal. For example, detaching from and re-arranging the fastening element at the connection element could change a change of the electric conductance between the interface unit, first fastening element contact portion, measuring element, second fastening element contact portion and interface unit. This change can be interpreted as an unauthorized detaching of the fastening element.

A detachable connection of the at least one fastening element contact portion with the connection element has the advantage that the seal can be used several times with various products to be sealed without damaging the seal for further use. Moreover, an evaluation for an undesirable manipulation of the seal is possible.

Preferably, the initially obtained physical property is deposited in the memory of the chip.

In one embodiment, the interface device may comprise at least four interfaces, two interfaces contacting the measuring element in the region of the first and second fastening element contact portion. The two further interfaces are connected with the measurement device. The interfaces associated with the measurement device can be connected with the interfaces associated with the measuring element, for example, by means of wire jumper, i.e. firmly.

Instead of a firm connection, an interface matrix can be provided, by means of which the connection between the interfaces associated with the measurement device and the interfaces associated with the measuring element can be connected. The association of the interfaces (also terminals of the interface device) with each other or the interface matrix can be represented by a configuration matrix. In particular when several measuring elements are used, interfaces of the interface unit can be connected with the measurement device simply and fast. The measuring elements or their terminals, upon manufacturing and/or upon sealing, i.e. for arranging the seal at a product to be sealed, do not have to be sorted and arranged at the interface associated with the measuring element. The association can be effected, for example in a software-controlled automatic fashion, for example, by the chip and/or the measurement device. Furthermore, an association can be adjusted via a read-write device communicating with the seal at the interface matrix. In particular, the interface device, the measurement device and/or the chip can start a learning process for establishing the connections and the association of the interfaces or for configuring the interface matrix. The configuration (configuration matrix) can be stored in the chip or a background system. The interface matrix is thus formed to connect the measuring element with the measurement device.

In particular when several measuring elements are used in the fastening element, the interface device can be provided with a profiling for contacting the measuring elements. The interface device here preferably has cutting contacts. In one configuration, the cutting contacts are arranged and/or aligned corresponding to the profiling, i.e. corresponding to the position of the cutting contacts one or several measuring elements of the fastening element are, preferably electrically contacted. Via an association of cutting contact with contacted measuring element, the fastening element can be checked for manipulation, for example, by a simple continuity check. The fastening element can have a profiling complementary to the interface device. This ensures that to the profile positioning a measuring element is contacted by a cutting contact, while at the same time a manipulation by, for example, detaching and subsequent re-contacting preferably by omitting a twist protection is safely recognized. Furthermore, any terminal of the fastening element and/or of the connection element, for example terminal opening, can analogously be formed having a profiling, preferably a circumferential one.

The antenna is designed for transmitting information. In particular, it is an antenna for receiving RFID signals. Preferably, the chip or the seal have no power supply on their own. For a transmission over larger ranges there is provided in particular UHF-RFID. An exchange of information between a reading device and the seal is effected preferably by means of modulated backscatter (RADAR backscatter). The antenna can be structurally formed corresponding to the type of information transmission.

Corresponding to the measuring element, the measurement device can be formed for obtaining an electric, temporal, acoustic or capacitive property, the measurement device and/or the chip can derive from the property of the measuring element, for example, a determination of the length of the measuring element, for example, between the corresponding interfaces.

In a preferred embodiment, the fastening element is formed strand-shaped. The fastening element can be arranged, for example, in an opening of a container, so that by opening the container the strand-shaped fastening element is manipulated. Furthermore, the fastening element can be formed as a strap. The fastening element can be arranged, for example, at a through opening or at a flange, so that for example the container is opened only by manipulation, in particular destruction of the fastening element. Furthermore, the fastening element can have an areal form. If several measuring elements are arranged in the fastening element and/or a measuring element is configured as a forward and return conductor, all the conductors are arranged in one common plane. This enables a space-saving and at the same time areal and narrowly enclosing rest against a product to be sealed.

In a preferred configuration, the seal is suitable for use in combination with one of the above-mentioned method steps and/or for application as a seal in one of the above-mentioned method steps.

For a manipulation to be reliably provable, the fastening element is preferably connected non-destructively undetachably with the interface unit and/or with the connection element.

BRIEF DESCRIPTION OF THE DRAWINGS

Further features, advantages and objects of the invention will emerge from the following detailed description of several embodiment examples and embodiment alternatives. Reference is made to the drawings, in which there are shown.

DETAILED DESCRIPTION OF VARIOUS EMBODIMENTS

Figure 1A:
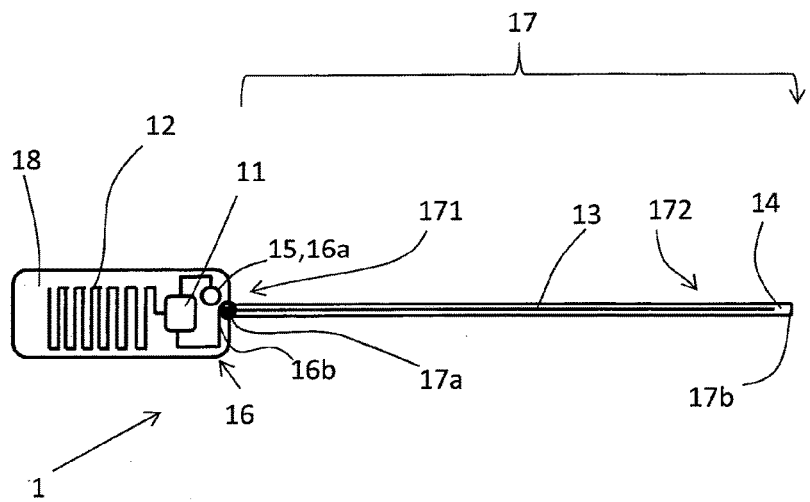
FIG. 1a a schematic representation of a preferred embodiment of a seal according to the invention, FIG. 1b a further representation of an embodiment of a seal according to the invention, FIG. 1c a further representation of an embodiment of a seal according to the invention, FIG. 2a-b a further schematic representation of an embodiment according to the invention, FIG. 3 a schematic representation regarding the configuration of interfaces in an embodiment according to the invention, FIG. 4a-d a schematic representation of a method for attaching a seal according to the invention and checking the intactness of a product according to the invention, FIG. 5 a further representation for attaching a seal according to the invention to a product, FIG. 6a-c embodiments for attaching a seal according to the invention to a container, FIG. 7 an embodiment for attaching a seal according to the invention to a container.

FIG. 1a shows a first preferred embodiment of the invention. A seal 1 comprises a connection element 18 and a measuring element 13. The connection element 18 is formed in a plate shape and has a low thickness in relation to a length and width. The connection element 18 comprises a chip 11 and an antenna 12.

The chip 11 and the antenna 12 here are arranged within the connection element 18 and surrounded by the material of the connection element. In a further embodiment, the chip 11 and/or the antenna 12 can be arranged, for example, in the fastening element. The antenna generates an electric energy from an electromagnetic field and makes it available to the chip 11 for the power supply thereof. The connection element 18 has a terminal opening 15 which extends through the thickness of the connection element 18.

From a lateral edge of the connection element 18 there protrudes the fastening element 17. The fastening element 17 is elongate and formed in a strip shape. In addition, the fastening element 17 is formed flexibly. The fastening element 17 has a first end 17a connected with the connection element 18. In the region of the connection between the first end 17a and the connection element 18 there is defined a first fastening element contact portion 171 at the fastening element 17. The fastening element 17 has a second end 17b which in its longitudinal extension is located opposite the first end 17a. In the longitudinal extension of the fastening element 17 at the fastening element 17 there is specified a second fastening element contact portion 172 which is spaced apart from the first fastening element contact portion 171. The fastening element 17 comprises a measuring element 13 which is surrounded by an enclosure 14. The measuring element 13 extends substantially in the longitudinal extension of the fastening element 17 approximately over its length. The second fastening element contact portion 172 is limited to the extension of the measuring element. Preferably, as represented in FIG. 1a, the measuring element 13 does not extend up to the second end 17b. Rather, between the maximum extension from the first fastening element contact portion 171 to the second end 17b there is a space free from measuring elements in the fastening element 17.

The measuring element 13 is connected via an interface device 16 of the connection element 18 with the chip 11. The interface device 16 comprises the first interface 16a and a second interface 16b. The second interface 16b is formed as an integrated terminal. The second interface 16b is arranged at the first end 17a of the fastening element 17, and at the first fastening element contact portion 171 it is connected with a first portion of the measuring element 13.

The first interface 16a is formed in combination with the terminal opening 15. The first interface 16a has a cutting/clamping contact unit (not represented). The cutting/clamping contact unit of the first interface 16a is connected with the chip 11.

Figure 1B:
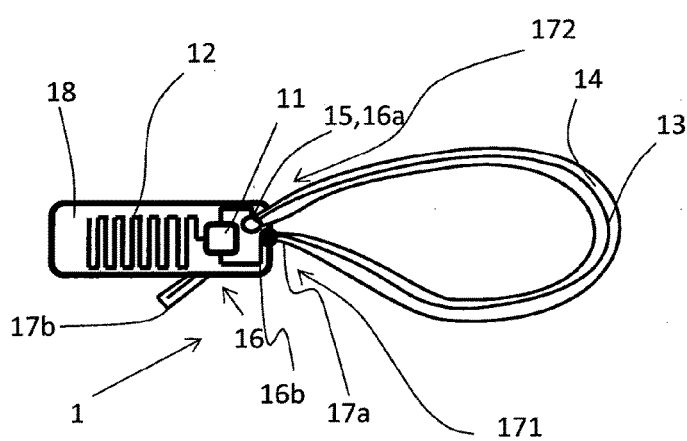

The seal 1 can be arranged thereon for sealing a product. FIG. 1b shows by way of example the seal 1 of FIG. 1a after arrangement at the product. The second end 17b is received by the terminal opening 15 and led therethrough. The cutting/clamping contact unit is formed to severe the enclosure 14 and contacts the measuring element 13. The region in which the fastening element 17 is mechanically fastened at the connection element 18, i.e. at the first interface 16a, exactly specifies the second fastening element contact portion 172.

Between the first interface and the second interface 16b, the measuring element 13 forms a measuring path. The chip 11 can determine, for example, electric properties of the measuring element 13. The fastening element 17 is mechanically connected and clamped with the connection element 18 via the second fastening element contact portion 172 and the first interface 16a. The fastening element 17 forms a strap.

After the fastening element 17 has been arranged at the first interface 16a, a measurement device of the chip 11 can initially determine the electric property of the measuring path. A contactless reading device can send a corresponding command to the chip 11.

If the second fastening element contact portion 172 is detached from the first interface 16a by an attacker and again arranged (manipulated), it is nearly impossible for the attacker to attach the second end 17b exactly to the same place as upon the preceding first attachment to the first interface unit 16a. With the help of the measurement device, preferably the chip 11 can compare the initially (first or preceding measuring) determined value regarding the physical property and the one for the electric property being present now (second measuring).

If the chip 11 recognizes, for example, a change of the electric conductance of the measuring path, a manipulation of the seal 1 is to be assumed. If the chip 11 obtains no or only a very low change, for example within a tolerance range, no manipulation is to be assumed. Instead of the electric property of the measuring path, the measurement device can carry out an optical or acoustic check. The chip 11 may comprise a memory for storing measurement values. Upon first-time attachment the chip 11 can store an initial measurement value for the measuring path. Each new putting into operation of the chip 11 could prompt a new checking of the measuring path. The chip 11 detects whether a manipulation of the seal 1 is present.

Instead of the initial obtaining of the physical property of the measuring path, this property can already be deposited during the manufacturing and, where applicable, be present stored in the chip or a background system. The obtained physical property can be an analogue value or a binary value, for example whether electric continuity of the measuring path is present. Each time the chip 11 is put into operation, initially and/or post-initially (after the first check) a test signal can be fed into the measuring path, preferably the second interface 16b, and be checked at the output of the measuring path, preferably the first interface 16a, for the signal.

From FIG. 1b it is in particular apparent that the measuring element 13 extends in longitudinal extension over the second fastening element contact portion 172. It is thus in particular ensured that the measuring element 13 extends, after the seal 1 has been arranged at the product to be sealed, through the terminal opening 15, so that the measuring element 13 over its entire length or longitudinal extension extends away from the connection element 18 and again back to the connection element 18. A manipulation of the fastening element 17 would therefore necessarily cause a manipulation of the measuring element 13. By checking the measuring element 13 the manipulation In FIG. 1c there is represented a further embodiment of a seal 1 according to the invention of FIG. 1a. The seal 1 is formed similarly to the seal 1 of FIG. 1a, and accordingly has a connection element 18 which is formed in a card-shaped (plate-shaped) fashion. From the card-shaped, areal connection element 18 there protrudes a flexible, elongate, strip-shaped fastening element 17. In the connection element 18 there are arranged an antenna 12 as well as a chip 11. The antenna 12 serves for the power supply of the chip 11 and its communication, for example, with a reading device and/or background system.

In contrast to FIG. 1b, the fastening element 17 has a measuring element 13 which is formed as a conductor loop in the fastening element 17. The measuring element 13 is surrounded by an enclosure 14. A first end 17a of the fastening element 17 is firmly connected with the connection element 18 and specifies the first fastening element contact portion 171. The measuring element 13 extends from the first end 17a in the longitudinal direction of the fastening element 17 substantially over the entire length of the fastening element 17, with the measuring element 13 extending from its first end within the fastening element 17 away from this first end and being led back again in the direction of the first end, so that a second end of the measuring element 13 is arranged at the first fastening element contact portion 171.

A second end 17b of the fastening element 17 is located, in longitudinal extension of the fastening element 17, opposite the first end 17a. In the region of the second end 17b at the enclosure 14 there are formed several locking noses 141 and in the non-sealed-state of the seal 1 specify the second fastening element contact portion 172. The locking noses 141 are formed in barb-shaped fashion at the enclosure 14 and oriented obliquely away from the second end 17b. The position of the fastening element contact portion 172 is specified by the maximum distance of the measuring element 13 from the first fastening element contact portion 171. Preferably, the locking noses 141 and thus the second fastening element contact portion 171 are located between this maximum distance/extension of the measuring element 13 and the first fastening element contact portion 171. It is thus ensured that upon a manipulation of the seal 1 and thus a manipulation of the fastening element 17 the measuring element 13 is damaged, with the damage being reliably detected. Even when, as represented in this Figure, the measuring element 13 is formed as a conductor loop and thus as a forward and return conductor, the turning point of the measuring element 13 represents the maximum distance. In the case of a measuring element 13 being a single conductor (merely forward conductor), the maximum distance would be specified by the end of the measuring element 13 located opposite the interface 16.

The connection element 18 has an interface device 16 at the first fastening element contact portion 171. Via the interface device 16, the chip 11 is connected with the conductor loop of the measuring element 13. The first end of the measuring element 13 is connected with a first interface 16a of the interface device 16 and the second end of the measuring element 13 is connected with a second interface 16b of the interface device 16. The conductor loop forms a measuring path for determining electric properties of the measuring element 13 by a measurement device in the chip 11.

The connection element 18 has a terminal opening 15. The terminal opening is formed for receiving and leading through the second end 17b of the fastening element 17. For sealing a product, the second end 17b is led through the terminal opening 15. At least one locking nose 141 of the fastening element 17 engages behind the connection element 18 in the terminal opening 15. On account of the barb-shaped configuration of the locking nose 141 the second end 17b cannot be detached out of or from the terminal opening 15. The locking nose 141 retains the second end 17b at the terminal opening 15, so that upon an opening attempt the fastening element 17 is destroyed in its longitudinal extension, e.g. is torn open. This results in a destruction of the conductor-loop-shaped measuring element 13. The measurement device in the chip 11 can detect, for example, by a continuity check to the measuring element 13 the destruction thereof. The region, at which the locking nose 141 engages behind the connection element 18 forms exactly the second fastening element contact portion 172 in the sealed state.

Figure 2A:
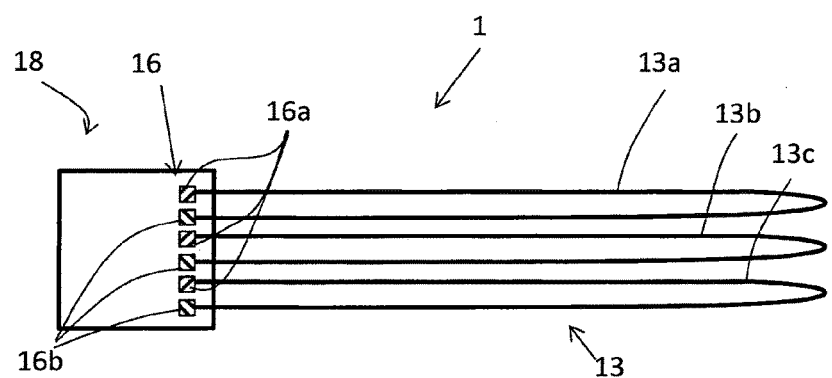

FIG. 2a schematically represents a portion of the seal according to the invention. From a connection element 18 there extends a measuring element 13, which comprises a first, a second, and a third measuring element 13a, 13b, 13c. The first, second, and third measuring elements 13a, 13b, 13c are respectively formed as conductor loops. The first, second, and third measuring elements 13a, 13b, 13c are connected with the connection element 18 via an interface device 16. The interface device 16 has three first and three second interfaces 16a, 16b (respectively marked by diagonal hatching.). Each conductor loop or each measuring element 13a, 13b, 13c is respectively connected with one of the first and one of the second interfaces 16a, 16b. The first and second interfaces 16a, 16b are respectively connected with a measurement device (not shown), preferably of a chip. The first and second interfaces 16a, 16b to the first, second, and third measuring element 13a, 13b, 13c are respectively arranged side by side. The first and second interfaces 16a, 16b alternate in their positions.

In one embodiment, it can be provided that the first, second, and third measuring elements 13a, 13b, 13c are switched in series. The second interface 16b to the first measuring element 13a would be connected with the first interface 16a to the second measuring element 13b. Furthermore, the second interface 16b to the second measuring element 13b would be connected with the first interface 16a to the third measuring element 13c. The first interface 16a to the first measuring element 13a and the second interface 16b to the third measuring element 13c would be connected with the measurement device. The measuring path altogether available is lengthened.

The first, second, and/or third measuring elements 13a, 13b, 13c are surrounded preferably by an enclosure (not shown). The enclosure can surround the first, second, and/or third measuring element 13a, 13b, 13c as a whole or each measuring element 13a, 13b, 13c separately. In case of a separate enclosure of the first, second, and third measuring element 13a, 13b, 13c, the connection element 18 could have one separate terminal opening for each measuring element 13c, 13a, 13b.

Figure 2B:
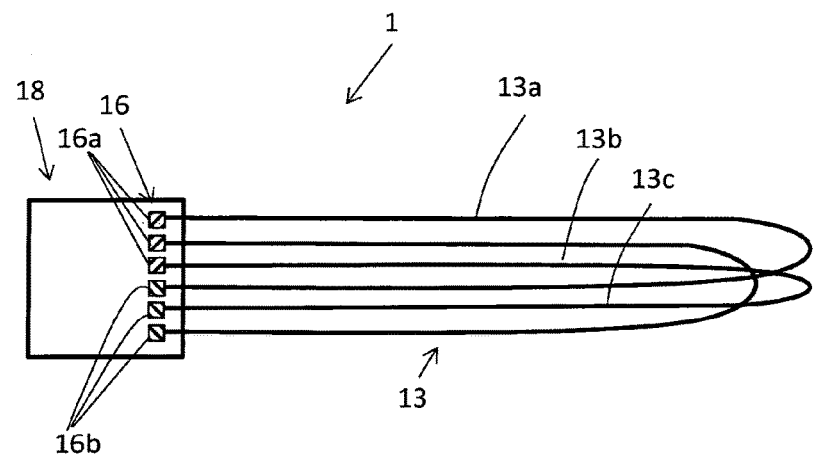

FIG. 2b schematically shows an embodiment alternative to FIG. 2a. As opposed to the embodiment according to FIG. 2a, the first interfaces 16a are arranged lying side by side and the second interfaces 16b are arranged lying side by side. Each of the measuring elements 13a, 13b, 13c at one end is connected with an associated first interface 16a and at the other end with an associated second interface 16b.

In comparison to the configuration according to FIG. 2a, after having severed the fastening element it is nearly impossible for an attacker to functionally restore or to re-connect the severed measuring elements 13a, 13b, 13c. In particular an association of the severed ends is only possible with high effort. After such a manipulation, the seal can recognize the faulty association as an error upon a check of the measuring elements 13a, 13b, 13c. The manipulation is reliably recognized.

Figure 3:
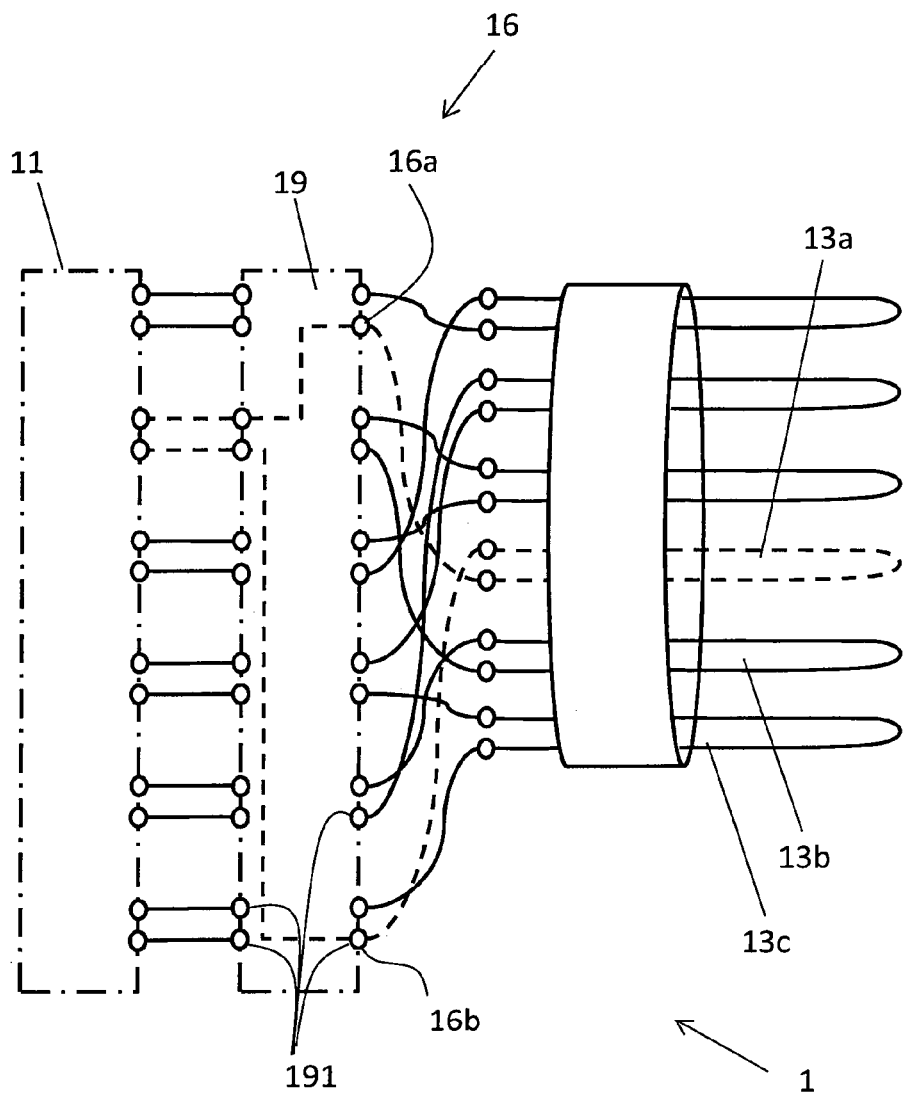

FIG. 3 schematically shows a further embodiment of a seal 1 according to the invention. FIG. 3 shows in particular an interface matrix 19 of an interface device 16 in detail. A first measuring element 13a is connected with a first and a second interface 16a, 16b of the interface device 16. The interface matrix 19 connects the terminals of a chip 11, which are associated with the measurement device, with the first and second interfaces 16a, 16b.

The measuring element 13a can be connected with any arbitrary interfaces 191 of the interface device 16.

In particular upon the manufacturing of the seal according to the invention, the conductor loops of the first and of a second and third measuring element 13a, 13b, 13c can be arbitrarily or randomly linked to an interface 191 of the interface device 16. A configuration matrix specifies the associations in the interface matrix 19. Via the interface matrix 19, terminals of a measurement device are associated, in the chip 11, with interfaces 191 of the interface matrix 19, so that, finally, terminals of the measurement device are associated with the first, second, and third measuring element 13a, 13b, 13c. The interfaces 191 of the interface matrix 19 are thus respectively specified as the first or second interface 16a, 16b of the interface unit of the first, second, and/or third measuring element 13.13b, 13c.

A presorting of the measuring elements 13a, 13b, 13c or of the conductor loops is not necessary. After contacting the measuring elements 13a, 13b, 13c with the interfaces 191 there can be executed, for example, a learning process of the configuration matrix, in order to connect the first, second, and/or third measuring elements 13a, 13b, 13c with the measurement device accordingly. In doing so, for example, a signal could be applied to an interface 191 specified or selected before, which is specified as the first interface 16a. The further interfaces 191 are queried as to the signal. The interface 191 which has the respective signal is considered to be the second interface 16b to the first measuring element 13a. Analogously, the interface matrix 19 to the second and third measuring element 13b, 13c is configured, for example, by means of software. The configuration matrix can be deposited, for example, in a memory of the chip 11.

With the help of such a configuration matrix the terminals of the first, second, and third measuring elements 13a, 13b, 13c can be arbitrarily connected with the interface device 16. An attacker who destroys, for example, the fastening element 17 and accordingly interrupts the conductor loops of the measuring elements 13a, 13b, would have to access the chip 11 for reading out the interface matrix 19. A product which is sealed with a seal according to the invention can be proven to have been accessed without authorization. With the help of the invention, a manipulation of the seal 1 without the manipulation being recognized is excluded.

FIG. 4 shows a possible method for sealing and transporting a product. The products are, by way of example, bank notes 5.

In a first method step (FIG. 4a) the bank notes 5 are arranged in bundled fashion in a transport cassette 4, e.g. a cash box. The transport cassette 4 comprises an upper housing portion 41 and a lower housing portion 42. The upper housing portion 41 and the lower housing portion 42 can be arranged relative to each other and form a receiving space for receiving the bank notes 5. The upper housing portion 41 as well as the lower housing portion 42 have an upper and a lower fastening flange 43, 44, respectively. The upper fastening flange 43 and the lower fastening flange 44 protrude from the upper housing portion 41 and from the lower housing portion 42, respectively, on the same side of the transport cassette 4. They are aligned, that with the transport cassette 4 closed, i.e. the upper housing portion 41 lies on the lower housing portion 42, they coincide at least in some portions.

Figure 1C:
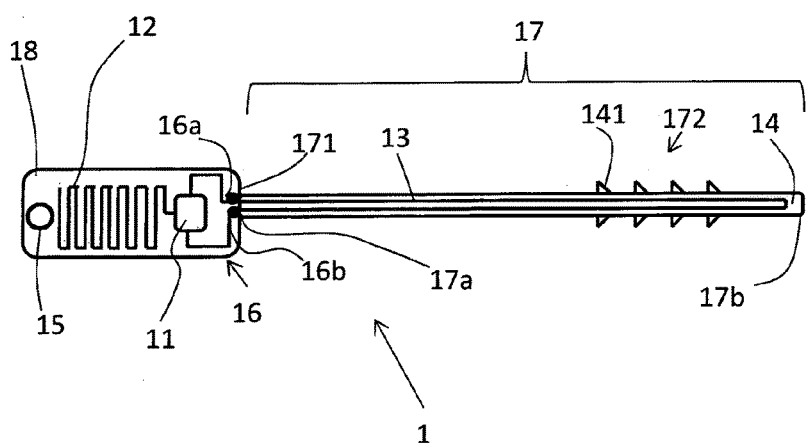

FIG. 4*b* shows the sealing of the transport cassette 4. The upper fastening flange 43 and the lower fastening flange 44 have an opening which with the transport cassette 4 closed are in alignment to each other. A seal 1, for example according to FIG. 1*a* to *c*, is arranged at the transport cassette 4. The seal 1 has a connection element 18 from which there extends an elongate, flexible, strip-shaped fastening element 17. The fastening element 17 has a measuring element 13 surrounded by an enclosure. The connection element 18 comprises a chip and an antenna. The antenna serves for supplying the chip with electric energy and for the contactless communication with a reading apparatus 21.

The seal 1 is arranged at the transport cassette 4 by the fastening element 17 being pulled through openings of the upper and lower fastening flange 43, 44 and being fastened non-destructively undetachably at a terminal opening 15 of the connection element 18. The seal 1 mechanically prevents an opening of the transport cassette 4 and simultaneously seals the same. The measuring element 13 is, for example, a conductor loop (see. FIG. 1*c*).

After the sealing of the transport cassette 4 by the seal 1, the chip of the seal 1 is read out contactlessly with the help of the reading apparatus 21. A measurement device in the seal obtains an electric property of the measuring element 13, for example the electric continuity. This is deposited in a memory of the chip as well as in a background system, for example an external data base 3 on a server, with an identifier of the chip. The server is connected via a communication network with the first reading apparatus 21.

After the mechanical sealing and data communication the transport cassette 4 is handed over to a delivery van 6 (FIG. 4*c*). The delivery van 6 has a transport compartment 61 for the transport cassette 4. In or next to the transport compartment 61 there is located a second reading apparatus 22 with which the chip of the transport cassette 4 can be read out. The second reading apparatus 22 is connected via a delivery van antenna 62 with the background system. A logistics company of the delivery van 6 can access, for example, the background system for checking and monitoring purposes. With reading the seal by the second reading apparatus 22 the background system can be informed that the transport cassette 4 is in the delivery van 6. In combination with a GPS system, the exact position and the state of the transport cassette 4 can be tracked online during the transport. If the seal is manipulated, the seal and/or the second reading apparatus 22 can immediately send a corresponding manipulation indication to the background system.

After the delivery van 6 has arrived at its destination, the transport cassette 4 is handed over to an input region 7 (FIG. 4*d*). A third reading apparatus 23 reads out data from the seal 1 and sends these to the background system. The background system compares the read-out data with the data base 3. These data comprise, for example, the data regarding the electric property of the measuring element of the seal 1 stored during sealing (see FIG. 4*b*) as well as properties of the measuring element currently measured anew in the input region 7. If a match of the measurement data is affirmed by the background system and/or by the seal 1, no manipulation of the seal 1 is present. If the seal 1 obtains a different property compared to the measurement from FIG. 4*b*, possibly, a manipulation of the seal 1 and an unauthorized access to the bank notes 5 within the transport cassette 4 are present.

FIG. 5 shows a further representation regarding the application of the seal according to the invention 1. The seal 1 has a connection element 18 and a fastening element 17. The connection element 18 is formed in the shape of a band. The connection element 18 has, in relation to its width, a great longitudinal extension and a low thickness. Additionally, the connection element 18 is flexible in its form. The connection element 18 comprises a chip 11 and an antenna 12 connected with the chip 11. Furthermore, the connection element 18 has a terminal opening 15 at one end. The fastening element 17 protrudes from the connection element 18 at the end located opposite the terminal opening 15.

The fastening element 17 comprises a measuring element 13 which is surrounded by an enclosure. The measuring element 13 is firmly connected with the chip 11 via a first interface 16*a* and forms a first fastening element contact portion 171 of the fastening element 17 at this position. In the present case, the first interface 16*a* is arranged immediately at the chip 11. The terminal opening 15 has several cutting/clamping contacts. Each of the cutting/clamping contacts is connected via an electroconductive connection with the chip 11. The cutting/clamping contacts form a second interface 16*b*.

For sealing a stack of bank notes 5 (bank note stack), which comprises a particular number of bank notes 5, the seal 1 according to the invention can be arranged at the bank note stack like a band. For fastening the seal 1, the fastening element 17 is guided through the terminal opening 15 and arranged at one of the cutting/clamping contacts. The cutting/clamping contacts penetrate the enclosure 14 of the fastening element 17. At this point, the position of a second fastening element contact portion 172 of the fastening element for sealing is exactly specified. The cutting/clamping contacts produce via the second interface 16*b* a connection with the chip 11. A measurement device in the chip 11 can determine electric properties via respective terminals of the chip 11, and the interfaces 16*a*, 16*b* and the measuring element 13. This value can be stored in the chip 11.

For removing a bank note from the bank note stack 5, it is necessary to open the seal 1. The fastening element 17 must be detached from the cutting/clamping contacts in the terminal opening 15. A new closing or sealing leads to the fact that the fastening element 17 is connected with the cutting/clamping contacts at a position different from the first sealing. A new readout of the chip 11 and thus new checking of the measuring element 13 leads to the measurement device 11 determining a second measurement value in view of the measuring element 13. The chip 11 compares the stored value with the value determined now. The second measurement value differs from the measurement value measured upon the first sealing. On account of the difference of the measurement values the chip 11 recognizes that with high probability a manipulation of the seal 1 is present. The chip 11 sends this result to a reading device.

Figure 6A:
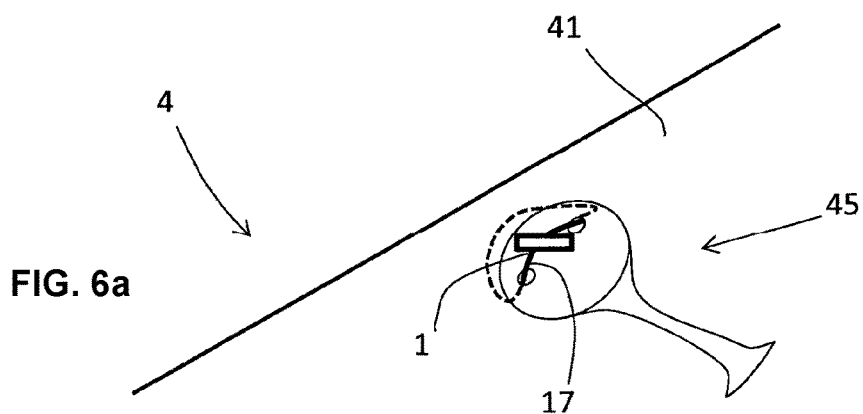
Figure 6B:
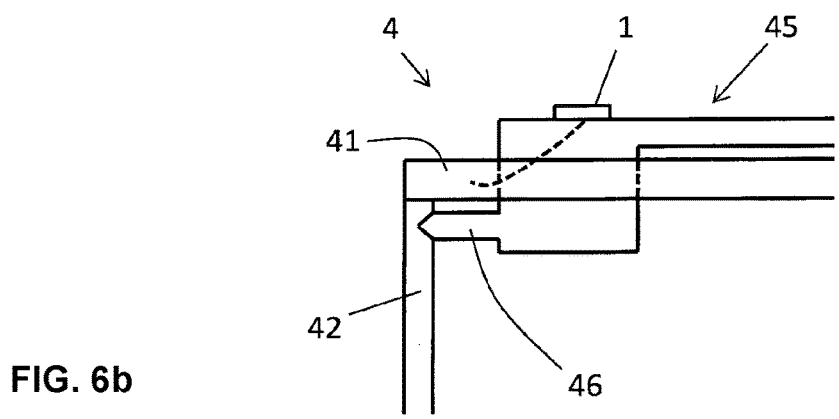

FIGS. 6*a* and 6*b* show a further application possibility of the seal according to the invention. At a transport cassette 4 at an upper housing portion 41 (see for example FIG. 5*a*)

there is arranged a latching lever 45. With the help of the latching lever 45 the upper housing portion 41 can be fastened to the lower housing portion 42. The latching lever 45 is rotatably mounted and has a bolt 46 which engages in a side wall of the lower housing portion 42. The latching lever 45 and the upper housing portion 41 respectively have two through openings which are aligned and form a wound channel system in the upper housing portion 41 (dashed line). Through the two openings and through the channel system there is led a fastening element 17 of a seal 1 (cf., for example, FIG. 1*a*, 1*b*, or FIG. 5). The seal 1 secures the latching lever 45 in its closed position.

For opening the transport cassette 4, it is necessary to rotate the latching lever 45. The bolt 46 is moved away from the housing wall of the lower housing portion 42. The fastening element 17 of the seal 1 mechanically prevents a rotating of the latching lever 45. For allowing the latching lever 45 to be rotated, a damage of the seal 1 in the region of the fastening element is necessary, for example by severing or by shearing off while rotating the latching lever 45. With the help of a measurement device and of a chip on the connection element, such a damage or an attack on the fastening element 17 can be detected.

Figure 6C:
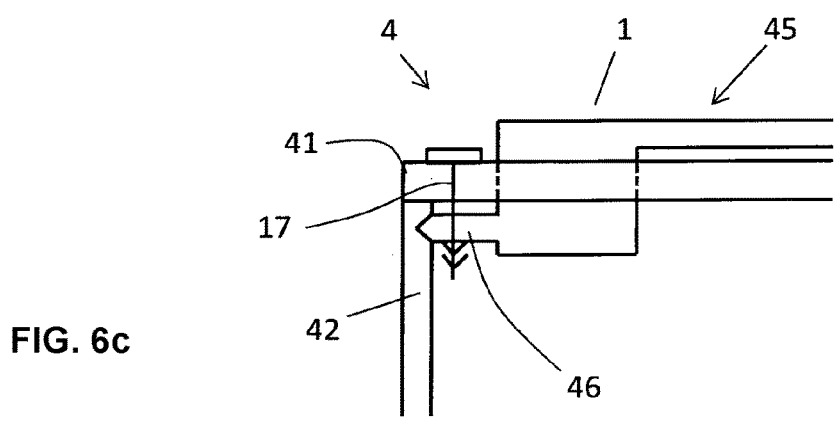

FIG. 6*c* shows an alternative to the embodiment examples of FIGS. 6*a* and 6*b*. The upper housing portion 41 has an opening which is in alignment with an opening in the bolt 46. A seal 1, for example according to FIG. 1*c*, is introduced from the sides of the upper housing portion 41 into both openings and engages behind the bolt 46. Upon rotating the latching lever 45, the fastening element 17 is sheared off which can be detected by the measurement device and/or the chip.

Figure 7:
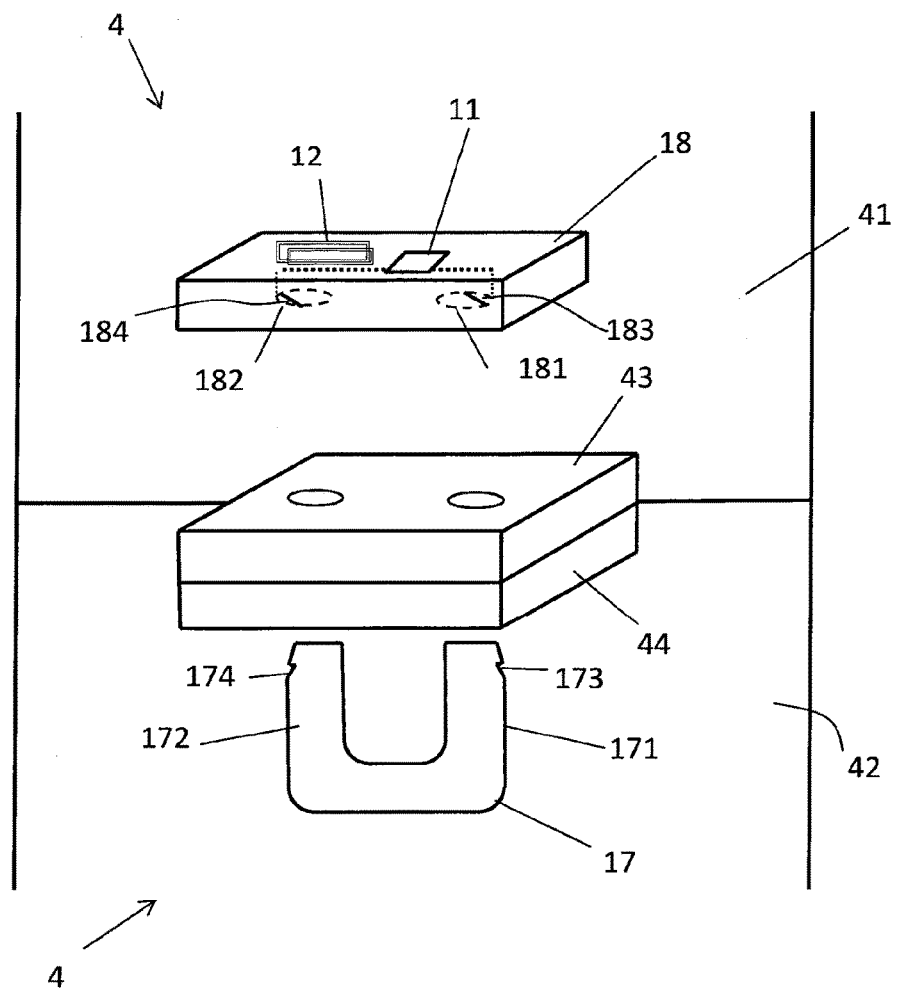

In FIG. 7 there is represented an alternative embodiment of the seal 1 according to the invention. The seal 1 according to the invention is arranged at a container similar to that of the FIG. 4. The container in this example is a transport cassette 4 and has an upper housing portion and a lower housing portion 41, 42. The upper housing portion 41 has an upper fastening flange 43 and the lower housing portion 42 has a lower fastening flange 44. With a transport cassette 4 being in a closed state, the upper fastening flange 43 is arranged congruently to the lower fastening flange 44. The upper fastening flange 43 and the lower fastening flange 44 respectively have two through openings which are in alignment to each other.

The seal 1 comprises a connection element 18 and a fastening element 17. The connection element 18 is formed as a cuboid. It has on one side two receiving openings 181, 182 which in their position correspond to the through openings of the upper fastening flange 43.

In addition, the connection element 18 has a chip 11 as well as an antenna 12. The chip 11 is connected with the antenna 12 and with the receiving openings 181, 182. In particular a measurement unit of the chip 11 is connected with the receiving openings 181, 182.

The fastening element 17 is formed as a U-shape and has two legs 171, 172. Both legs 171, 172 are dimensioned according to the openings of the upper fastening flange 43. The distance of the two legs 171, 172 corresponds to the distance of the openings of the upper fastening flange 43. The fastening element 17 is manufactured from an electroconductive material and forms at the same time the measuring element 13. The legs 171, 172 likewise are dimensioned such that they can be arranged in the receiving openings 181,182 of the connection element 18. In the receiving openings 181, 182 there is located a locking unit 183, 184 which can flexibly decrease the input region of the receiving openings 181 or 182. The ends of the legs 171, 172 are formed in a slightly tapered fashion and additionally have locking notches 173, 174.

For sealing the transport cassette 4, the fastening element 17 is arranged at the lower fastening flange 44 and upper attachment flange 43 such that the legs 171, 172 protrude through the through openings of the lower and upper fastening flange 44, 43. Furthermore, the connection element 18 is put onto the fastening element 17, the two legs 171, 172 penetrating the receiving openings 181, 182. The locking units 183, 184 lock with the lock notches 173, 174, thereby preventing a non-destructive removal of the fastening element 17 from the connection element 18. I.e., an opening of the transport cassette 4, namely removing the upper housing portion 41 from the lower housing portion 42, is only possible, when the fastening element 17 is split or the fastening element 17 is forcefully separated from the connection element 18. Such an action influences a measurement value which is measurable between the terminal pins to the terminal openings 181, 182. Even if a respective manipulation is repaired by joining the fastening element, an impairment is measurably recognizable. The chip 1 can ascertain such a manipulation. A reliable check of the manipulation of the seal is guaranteed.

Figure 8:
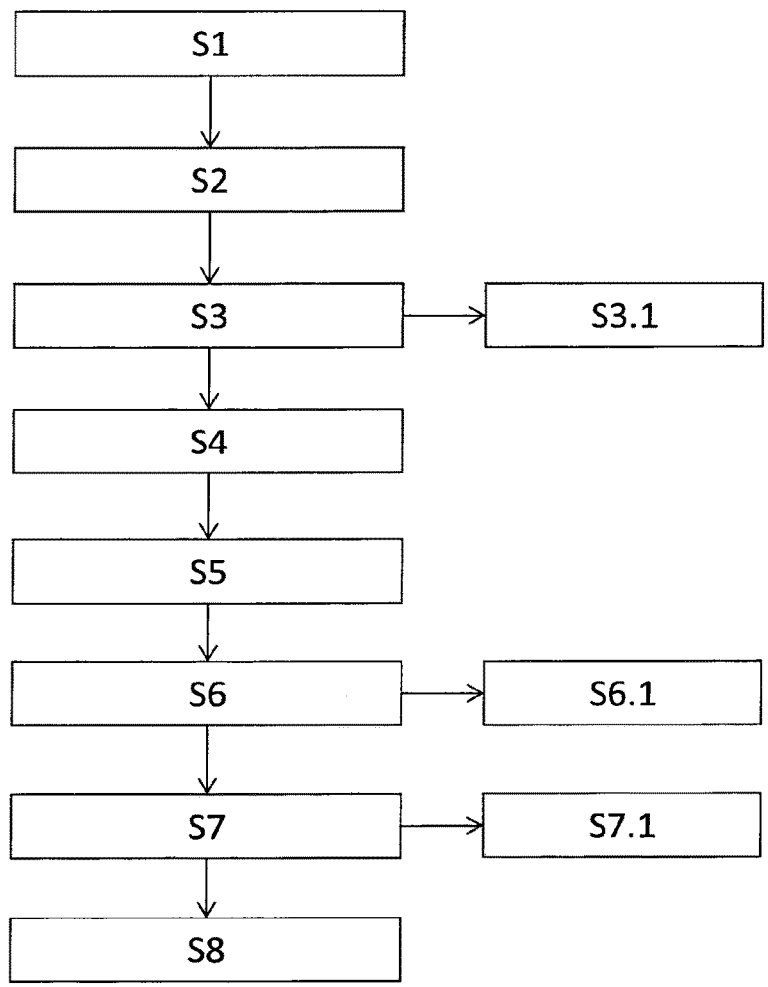
FIG. 8 flowchart of a method according to the invention for checking a product for manipulation with a seal according to the invention.

In FIG. 8 there is represented a flowchart of a method according to the invention for checking a product for manipulation with a seal according to the invention. The method, by way of example, is divided into two parts, namely sealing (steps S1 to S4) and checking (S5 to S8). In a first step S1, the seal is arranged at the product to be sealed. In doing so, the product is sealed, so that by seal a manipulation of the product causes a manipulation of the seal. A manipulation of the product can be, for example, the opening of a housing (the housing corresponds to the product) or a removal of a bank note from a bundle of bank notes (bundle of bank notes corresponds to the product to be sealed).

The seal has a chip. Furthermore, the seal has a measuring element which upon manipulation of the product to be sealed changes at least one of its physical properties, for example an electric resistance. The measuring element can be, for example, a conductor loop, a wire mesh, an optical or acoustic conductor or any other medium.

After the seal being arranged at the product to be sealed, a read-write device sends an initialization query to the chip (S2). The initialization query relates to determining the physical property of the seal. The chip receives the initialization query, whereupon a measurement device of the chip initially determines the physical property of the measuring element (S3). The chip stores this physical property as a reference value in a step (S3.1).

Furthermore, the chip prepares a response (S4) to the first query of step S2. In the first response the reference value is included. Furthermore, an identification number or any other identification value can be included in this response.

For checking whether the product was manipulated, a read-write device sends a check query to the seal (S5). In step S6, the seal determines the physical property of the measuring element as a first measurement value. The first measurement value is compared with the reference value by the chip (S6.1). The chip obtains from the comparative value whether a manipulation could be present. The chip sends the result of the comparison and the second measurement value as a response to the second read-write device (S7).

The second read-write device transfers these data to a background system and carries out on its part again a comparison with data stored in the background system, in particular with the first measurement value (S7.1). From this comparison and/or the comparison result of the chip the background system and/or the read-write device determine whether a manipulation of the seal or of the product to be sealed is present (S8). In other words, the chip, the read-write device, and/or the background system validate a potential manipulation of the seal. If between the first measurement value and the second measurement value there arises no difference or a difference lying within a determined frame, the chip, the read-write device, and/or the background system could come to the conclusion that no manipulation is present.

Instead of the steps S1 to S4, according to which a reference value is obtained, there can be stored a universally valid value or statement, e.g. "continuity", in the chip and/or background system. For sealing the product, the steps S1 to S4 may accordingly be omitted. In addition, in a transport process or storing process it may be necessary to check the seal several times. Accordingly, upon a successful check, i.e. no manipulation is present, the continuously obtained physical property of the measuring element can be used in each case as a new reference value and to start a new, e.g., second, check with step S5. Furthermore, the present reference value could be maintained and likewise a new check could be started with step S5. Using the seal anew could require a reset or renewal of the reference value preferably by an authorized person/system.

Figure 9:
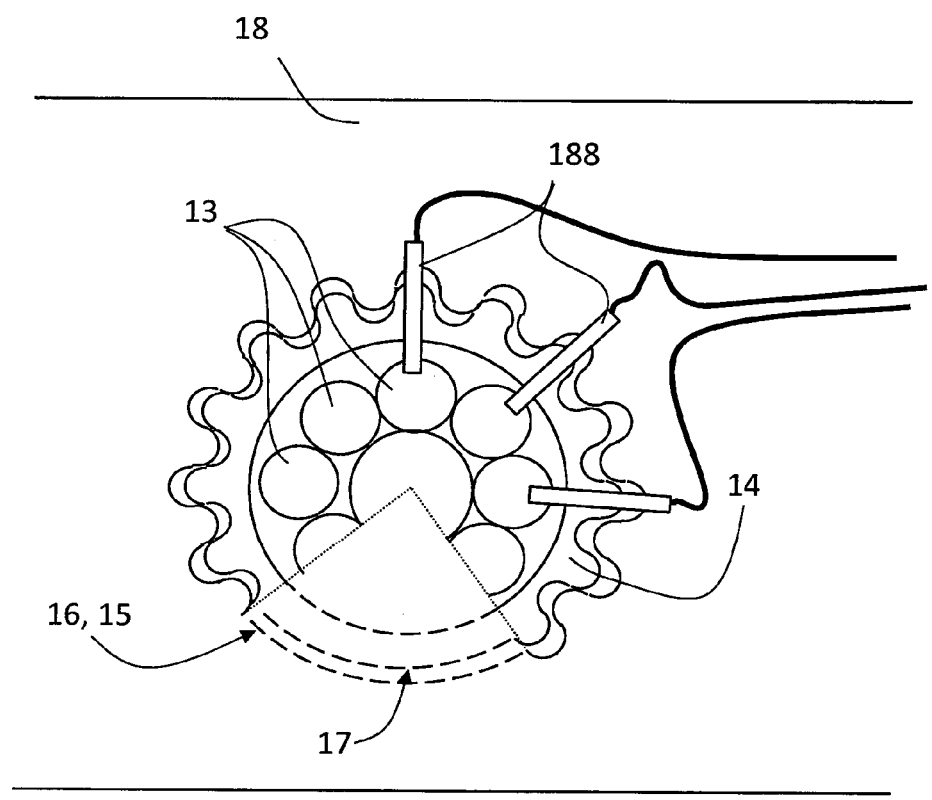
FIG. 9 a schematic representation of a profiling of a fastening element.

FIG. 9 shows an embodiment example of a seal in a sealed state, i.e., the latching element 18 contacts the first and/or the second fastening element 17. In FIG. 9 there is in particular shown a particular configuration of the interface 16 and/or terminal opening 15 in connection with a fastening element 17. The seal can be formed according to FIG. 1a-c or FIGS. 6 to 7. An enclosure 14 of the fastening element 17 surrounds a plurality of measuring elements 13 and is provided with a profiling. In the fastening element 17 there extend several measuring elements 13. In this embodiment example, for the sake of simplicity, there is represented only a detail of the latching element 18 and of the fastening element 17.

Basically, the profiling may extend over the entire circumference of the enclosure 14 or be formed only partially. Furthermore, the enclosure may be formed as a different structure, for example as bars, triangles or points. The connection element 18, in particular the interface 16 and/or terminal opening 15 for contacting the fastening element 17, for example first or second fastening element contact portion 171, 172 (see FIG. 1b, 1c) are formed complementary to the profiling of the fastening element 17.

The connection element 18 has several cutting contacts 188, which respectively penetrate the enclosure 14 of the fastening element 17 and one the measuring elements 13 and contact the respective measuring element 13. Via the cutting elements 188 there is established a contact with the interface device 16. On account of the profiling an association of measuring elements 13 to cutting contacts 188 is possible, so that an unintentional contacting of several measuring elements 13 by a cutting contact 188 and an unintentional non-contacting by a cutting contact 188 is prevented. Therefore, a defined contacting or non-contacting is possible. The cutting contacts 188 can be arranged such that, for example, upon formation of the terminal opening 15, the second fastening element contact portion 172 can be introduced into the terminal opening 15 but is secured against being pulled out again. Upon introducing the fastening element 17 it is in particular able to move substantially freely in the introduction direction, the cutting contacts 188 not violating the enclosure 14, upon a motion against the introduction direction, however, the cutting contacts penetrate the enclosure 14 and accordingly contact a measuring element 13 and fix the fastening element 17.

Upon a removal of the fastening element 17 from the connection element 18 and accordingly a manipulation, the fastening element 17 can again be brought into contact with the connection element 18, but a same positioning, in particular with a circumferential profiling, is more difficult. In addition, with a preferably biased arrangement of the measuring elements 13, an association of measuring element 13 with cutting contact 188 after a severing of the measuring elements 13 is nearly impossible. Upon evaluating the cutting contacts 188 in relation to the measuring elements 13, a manipulation is reliably recognizable.

The person skilled in the art will understand, that the profiling can be provided at the first and or at the second fastening element contact portion 171, 172.

The person skilled in the art will recognize that the functions, configurations and methods of the above-described seal and variations for arranging and checking a seal can vary strongly. In particular, the preceding figures show merely an extract of possibilities. Combinations of features of the preceding descriptions may, of course, also be possible.

The invention claimed is:

1. A method for sealing and checking a product for manipulation with a seal,
    wherein the seal comprises an antenna, a chip, a fastening element, a connection element, and a measurement device,
    the fastening element including a first end, a second end, a locking nose, and a measuring element extending between the first end and the second end of the fastening element,
    the measuring element being configured such that a particular physical property of the measuring element changes upon a manipulation of the seal and/or product and the measurement device is configured to determine the physical property of the measuring element,
    wherein the method comprises the following steps:
        arranging the seal at the product to be sealed including providing at least a portion of the second end of the fastening element through a terminal opening of the connection element and retaining the second end of the fastening element at the terminal opening by the locking nose of the fastening element, thereby sealing the product mechanically;
        receiving, by the seal, a check query by contactless data transmission from a read-write device;
        determining, by the seal, the physical property of the measuring element as a first measurement value;
        preparing a response to the query by the chip;
        contactlessly sending the response to the read-write device, the response of the chip relating to the first measurement value; and
        comparing the first measurement value to a reference value.

2. The method according to claim 1, wherein the chip stores the first measurement value and/or transfers it to a background system, including a user device and/or a server.

3. The method according to claim 1, wherein the steps of:
    setting the first measurement value as a reference value;
    receiving, by the seal, a second query from a read-write device;

second determining, by the seal, the physical property of the measuring element as a second measurement value; and comparing the second measurement value to the reference value.

4. The method according to claim 1, wherein the measurement device determines the physical property of the measuring element during the sealing.

5. The method according to claim 1, wherein upon the check query the response to the read-write device by the chip comprises the physical property of the measuring element and the response is sent to the read-write device.

6. The method according to claim 1, wherein the seal comprises an interface device, wherein during sealing a step of configuring the interface device of the chip and/or of the measurement device according to the measuring element is carried out.

7. The method according to claim 6, wherein upon configuring the interface device the measuring element, or terminals thereof, is/are associated with an interface of the interface device.

8. The method according to claim 6, wherein a physical association of the measuring element with the interface device and/or the chip with the interface device is effected during the operation of the chip and upon non-operation of the chip the physical association is eliminated.

9. The method according to claim 1, wherein the product is a container or a transport cassette, and before the sealing, a value element is arranged in the container or the transport cassette and the seal is arranged at the product and an access to the chip is prevented.

10. A seal comprising:
a fastening element, a connection element, a chip, an antenna and a measurement device;
wherein the fastening element comprises a first fastening element contact portion arranged toward a first end of the fastening element, a second fastening element contact portion arranged toward a second end of the fastening element, and a measuring element, the measuring element extending in a longitudinal direction of the fastening element between the first end and the second end of the fastening element;
the connection element is formed for mechanically contacting the first fastening element contact portion and the second fastening element contact portion, the measurement device being connected via an interface device with the measuring element and the measurement device is suitable for determining a particular physical property of the measuring element,
wherein the connection element includes a terminal opening configured to receive at least a portion of said second end of the fastening element leading through the terminal opening, and
a locking nose is provided at the second end of the fastening element, the locking nose configured to retain the second end of the fastening element at the terminal opening.

11. The seal according to claim 10, wherein the fastening element is formed in an elongate, strip-shaped, and/or flexible fashion.

12. The seal according to claim 10, wherein the measuring element is formed as an electrical conductor, an optical conductor, and/or a conductor loop.

13. The seal according to claim 10, wherein the flexible, elongate fastening element comprises an enclosure, which surrounds the measuring element at least partly.

14. The seal according to claim 10, wherein the first fastening element contact portion and the second fastening element contact portion are spaced apart from each other in the longitudinal direction of the fastening element.

15. The seal according to claim 10, wherein via the first fastening element contact portion and the second fastening element contact portion the interface device is connected with the measuring element.

16. The seal according to claim 10, wherein between the maximum distance of the measuring element from the first fastening element contact portion to the second fastening element contact portion there is formed a space free from measuring elements, which does not comprise the measuring element.

17. The seal according to claim 12, wherein the conductor loop in the fastening element has a return point,
wherein the return point specifies the maximum distance or longitudinal extension of the measuring element in the fastening element to the fastening element contact portion.

18. The seal according to claim 10, wherein the interface device has an interface which is formed as a clamping apparatus, including a cutting and clamping apparatus and/or as a lamella contact.

19. The seal according to claim 10, wherein the chip has a memory for storing the physical property of the measuring element.

20. The seal according to claim 10, wherein the flexible, elongate fastening element comprises at least two measuring elements,
and the at least two measuring elements are respectively surrounded by an enclosure and/or are arranged with a biased twisting to each other and/or to the fastening element.

* * * * *